United States Patent Office 3,107,250
Patented Oct. 15, 1963

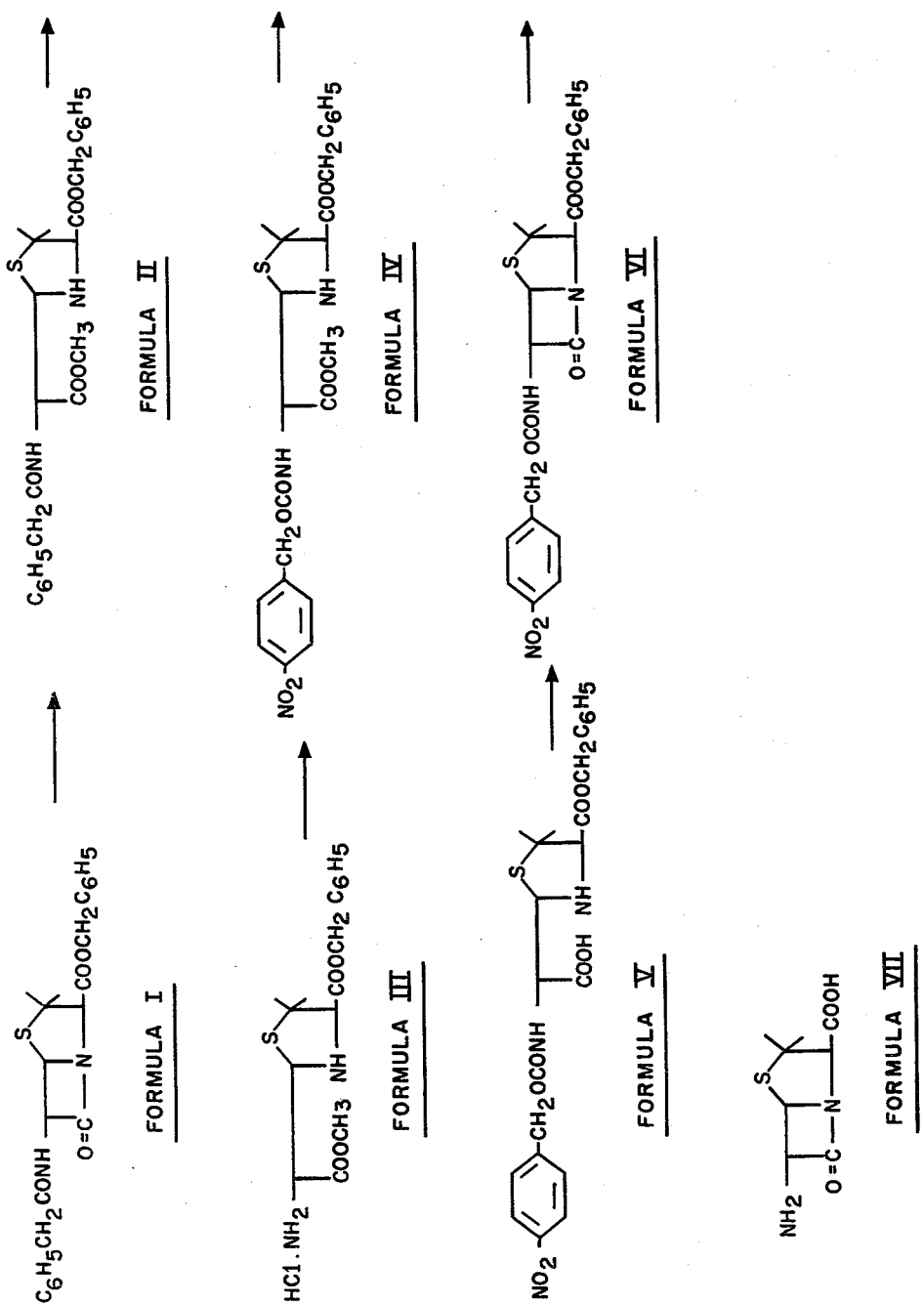

3,107,250
PROCESS FOR THE PREPARATION OF 6-AMINO-PENICILLANIC ACID AND NOVEL INTERMEDIATES USEFUL THEREIN
John Russel Hoover, Glenside, Pa., assignor to Smith Kline & French Laboratories, Philadelphia, Pa., a corporation of Pennsylvania
Filed Feb. 4, 1960, Ser. No. 6,805
2 Claims. (Cl. 260—306.7)

This invention relates to a process for the preparation of 6-aminopenicillanic acid and to novel intermediates useful therein.

The 6-aminopenicillanic acid prepared by the process of this invention is a valuable intermediate for preparing both "natural" penicillins and synthetic penicillins previously not obtainable by fermentation. Thus, by acylation of the 6-amino moiety with acid chlorides the corresponding penicillins are obtained.

In accordance with the novel process of this invention as schematically represented in FIGURE 1, the benzyl ester of penicillin G (Formula I) is treated with methanol containing a catalytic amount of a tertiary amine such as a tri-lower alkyl-amine, for example triethylamine or tributylamine, or a tertiary aromatic or heterocyclic amine, such as a di-lower alkyl-aniline, for example N,N-dimethyl- or diethyl-aniline, or pyridine preferably at ambient or room temperature, about 25° C. for from 8 to 24 hours to give the α-methyl penicilloate of Formula II. The penicilloate, preferably dissolved in methanol is treated with hydrogen chloride at a temperature in the range of from about 20–30° C. and the resulting methanolic acid solution is maintained in a closed system under an inert atmosphere advantageously nitrogen, at preferably ambient or room temperature, about 25° C. Alternatively, the reaction is run at an elevated temperature, for example up to about 50° C. The reaction time varies of course with the reaction temperature selected but is usually for a period of from 3 to 14 days.

Acylation of the resulting α-amino-2-triazolidine-acetate hydrochloride of Formula III with p-nitrocarbobenzoxy chloride yields the corresponding p-nitrobenzyloxycarboxamide of Formula IV. Advantageously the amine hydrochloride is dissolved in an unreactive organic solvent such as methylene chloride or chloroform and is then treated with a solution of the acid chloride in a similar solvent in the presence of a tertiary amine such as a tri-lower alkyl-amine, for example triethylamine or tributylamine, or a tertiary aromatic or heterocyclic amine, such as a di-lower alkyl-aniline, for example N,N-dimethyl- or diethyl-aniline, or pyridine at a temperature in the range of from about −5 to 10° C. The resulting mixture is allowed to stand at ambient or room temperature, about 25° C., for from 3 to 24 hours. Working up the mixture yields the α-(p-nitrobenzyloxycarboxamido)-2-thiazolidineacetate which is saponified to cleave the methyl ester by treatment with an aqueous methanolic solution of one equivalent of an alkali metal hydroxide for example sodium or potassium hydroxide, preferably sodium hydroxide, preferably at ambient or room temperature, about 25° C.

The free thiazolidineacetic acid of Formula V is obtained from the aqueous methanolic solution of the sodium thiazolidineacetate by acidification with dilute mineral acid such as dilute hydrochloric acid or sulfuric acid at a temperature in the range of from about 0 to 10° C. The aqueous solution is extracted with for example methylene chloride.

The organic solution containing the free thiazolidineacetic acid is treated with thionyl chloride to give the ring closed benzyl penicillanate of Formula VI. Advantageously the mixture of thiazolidineacetic acid and thionyl chloride is heated at a temperature in the range of from 35 to 45° C. for a short period of time preferably from 30–60 minutes.

The resulting benzyl penicillanate is dissolved in a lower alkanol such as methanol or ethanol and hydrogenated in the presence of a catalyst such as palladium or palladium-on-charcoal preferably at about 25° C. and atmospheric pressure. After 5 moles of hydrogen has been absorbed the filtered reaction mixture is evaporated in vacuo at low temperature, 5–10° C. The residue is dissolved in water at pH 6.5–7 and acidified with dilute hydrochloric acid to pH 4.5 to give upon cooling and standing 6-aminopenicillanic acid (Formula VII).

It is obvious from the above description that the process of this invention affords an advantageous route for the preparation of 6-aminopenicillanic acid. This process maintains the D configuration throughout the steps which is necessary for the preparation of biologically active penicillins. Further, the utility of the β-benzyl penicilloate, α-amino thiazolidineacetate and benzyl penicillanate of Formulae II, III and VI as intermediates in the process of this invention with retention of the D configuration is equally apparent. The availability of the D-α-amino-2-thiazolidineacetate of Formula III is a noteworthy contribution to the penicillin art. Also, the employment of moieties which can be removed easily in the final step of the process by hydrogenolysis without danger of opening the β-lactam ring is novel and highly advantageous. The term "lower alkyl" where used herein signifies aliphatic groups containing one to four carbon atoms.

The utility of 6-aminopenicillanic acid as a intermediate in the chemical synthesis of penicillins is schematically represented as follows:

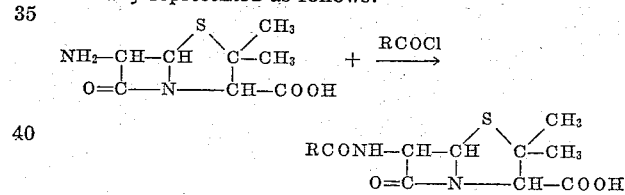

Thus, the acid is acylated with an acid chloride under standard conditions to give the penicillin. The R moiety may be varied to give both "natural" (for example R=benzyl) and synthetic penicillins.

The following will serve to illustrate the novel process of this invention and the utility of certain intermediates therein. Being illustrative the following is not intended to limit hte scope of this invention since obvious alternatives to the methods disclosed herein are likewise within the purview of this invention. For example, other benzyl type moieties susceptible to hydrogenolysis could be employed. Process conditions other than those described herein may be operative but have been found to offer little advantage over those outlined and claimed.

It is to be noted that the structural formulae depicted herein represent the D configuration.

Example 1

The benzyl ester of penicillin G (or benzyl benzylpenicillinate), 107 g., is dissolved in two liters of methanol containing 6 ml. of triethylamine and the solution is allowed to stand overnight at room temperature. Evaporation of the solvent in vacua gives the syrupy β-benzyl α-methyl-(D-α-benzylpenicilloate). On long standing the syrup crystallizes to the solid ester which upon trituration with methanol-water or recystallization and drying melts at 85–86° C.

Anhydrous hydrogen chloride is bubbled through a stirred solution of 102 g. of β-benzyl α-methyl-(D-α-benzylpenicilloate) in 920 ml. of anhydrous methanol at 20–25° C. After 30 minutes the solution is allowed to warm up to 28° C. and then the introduction of hydrogen chloride is stopped. The solution is stored in a stoppered flask under a nitrogen atmosphere at room temperature for 9 to 11 days. The solution is then filtered and concentrated in vacuo at 30° C. Two portions of alcohol are added and then removed in vacuo to take off traces of water. Remaining solvent is evaporated on a vacuum pump and the residue is triturated with anhydrous ether. The resulting solid is dried in vacuo to give crude methyl D-α-4-carbobenzoxy-5,5-dimethyl-α-amino-2 - thiazolidineacetate hydrochloride. The product is purified by dissolving in water, extracting with ether and then with chloroform. The chloroform extract is dried and evaporated. The residue is redissolved in chloroform and treated with an equal volume of ether to precipitate the thiazolidineacetate, M.P. 161–162° C. (dec.). after drying.

A solution of 5.62 g. of methyl D-α-4-carbobenzoxy-5,5-dimethyl-α-amino,2-thiazolidineacetate hydrochloride in 168 ml. of methylene chloride is chilled and 2.11 ml. of triethylamine is added. To the solution at 5° C. is added slowly with stirring a solution of 3.23 g. of p-nitrocarbobenzoxy chloride in 42 ml. of methylene chloride and a solution of 2.11 ml. of triethylamine in 42 ml. of methylene chloride. The chilled solution is stirred for 30–60 minutes and then allowed to stand at room temperature for 18–24 hours. The filtered reaction mixture is concentrated in vacuo and then treated with 250 ml. of benzene. The mixture is filtered, the filtrate concentrated and then treated with 1.5 l. of anhydrous ether. The resulting mixture is filtered, the filtrate concentrated and treated with 250 ml. of ether to give a clear solution. The ethereal solution is washed successively with 20% acetic acid, water, 5% sodium bicarbonate and water. The dried, filtered ether solution is concentrated to give methyl D-α-4-carbobenzoxy - 5,5 - dimethyl - α - (p-nitrobenzyloxycarboxamido)-2-thiazolidineacetate as a gum.

A solution of 5.82 g. of the above methyl thiazolidineacetate in 180 ml. of methanol is stirred and 60 ml. of water is added. The resulting mixture is treated with 101.25 ml. of aqueous 0.1 N sodium hydroxide solution dropwise with stirring over a four and one-half hour period, during which time an additional 100 ml. of methanol is added. At the end of the addition of base, 50 ml. of methanol is added and the mixture stirred for an additional 20 minutes. The solution is treated with charcoal, filtered and concentrated in vacuo at 30° C. The resulting mixture is extracted with ether and then the volume of solution was increased to 365 ml. with water. This aqueous solution contained the sodium salt of D-α-4-carbobenzoxy-5,5-dimethyl-α-(p-nitrobenzyloxycarboxamido)-2-thiazolidineacetic acid.

One hundred milliliters of the above solution containing the sodium thiazolidineacetate is treated with charcoal, filtered and adjusted to pH 6 with 20% acetic acid. Immediately, 25 ml. of 10% aqueous lead acetate solution is added. The precipitate is water washed and dried to give the lead salt of D-α-4-carbobenzoxy-5,5-dimethyl - α - (p-nitrobenzyloxycarboxamido)-2-thiazolidine-acetic acid, dec. at 120–123° C.

The remaining 265 ml. of the above solution containing the sodium thiazolidineacetate is treated with charcoal, filtered, chilled to 5–10° C. and 100 ml. of methylene chloride is added. Dilute hydrochloric acid is added dropwise with stirring to adjust the pH to 2. The aqueous phase is extracted with methylene chloride and the combined organic solutions are dried. The methylene chloride solution containing D-α-4-carbobenzoxy-5,5 - dimethyl-α-(p-nitrobenzyloxycarboxamido)-2-thiazolidineacetic acid is treated with 2.2 ml. of thionyl chloride and the resulting mixture is refluxed (at 40° C.) for 30 minutes. The solution is evaporated to dryness at room temperature. The residue is dissolved in methylene chloride, extracted with sodium bicarbonate, washed with water and then dried. Evaporation of the solvent in vacuo at room temperature yields the residual benzyl D-α-6-(p-nitrobenzyloxycarboxamido) - penicillanate.

The benzyl D-α-6-(p-nitrobenzyloxycarboxamido)-penicillanate is dissolved in dry methanol and this solution is added to a stirred suspension of palladium in dry methanol which has been pre-hydrogenated. The hydrogenation is continued rapidly until 5 moles of hydrogen are absorbed. The reaction mixture is filtered and the methanol removed in vacuo at 10° C. The residue is dissolved in a small volume of water at pH 6.5–7 and the solution acidified with dilute hydrochloric acid to ph 4.5. On cooling and standing 6-aminopenicillanic acid, M.P. 200° C. (dec.), separates which is identical with the natural compound obtained by fermentation.

*Example 2*

The following is exemplary of the utility of 6-aminopenicillanic acid.

6-aminopenicillanic acid (100 mg.) prepared as in Example 1 is acylated with phenylacetyl chloride in aqueous acetone in the presence of sodium bicarbonate to give penicillin G, a "natural penicillin."

Acylation of 100 mg. of 6-aminopenicillanic acid with benzylsulfonyl chloride yields 6-benzylsulfonamidopenicillanic acid, a synthetic penicillin derivative.

What is claimed is:

1. The method of forming 6-aminopenicillanic acid having the following formula:

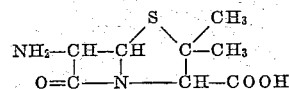

which comprises treating benzyl benzylpenicillanate with methanol in the presence of a tertiary amine to form an α-methyl penicilloate having the following formula:

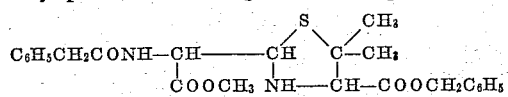

treating said penicilloate with hydrogen chloride to form an amino thiazolidineacetate hydrochloride having the following formula:

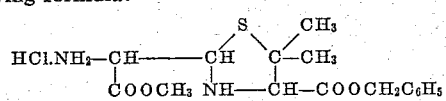

acylating said thiazolidineacetate with p-nitrocarbobenzoxy chloride in the presence of a tertiary amine to form a p-nitrobenzyloxycarboxyamido thiazolidineacetate having the following formula:

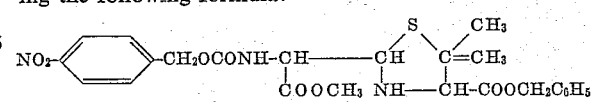

saponifying said carboxyamido thiazolidineacetate followed by acidification with mineral acid to form a thiazolidineacetic acid having the following formula:

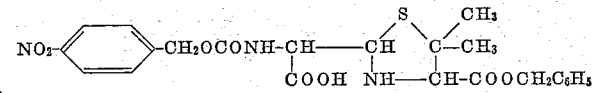

treating said thiazolidineacetic acid with thionyl chloride to give a benzyl penicillanate having the following formula:

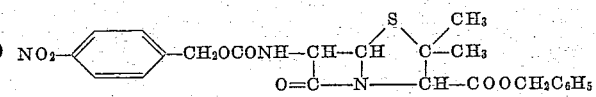

and hydrogenating said penicillanate in the presence of a palladium catalyst.

2. The method of forming methyl D-α-4-carbobenzoxy- 5,5-dimethyl-α-amino-2-thiazolidineacetate hydrochloride having the following formula:

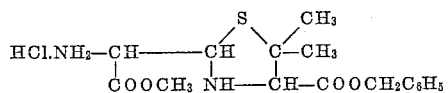

which comprises treating benzyl benzylpenicillanate with methanol in the presence of a tertiary amine to form an α-methyl penicilloate having the following formula:

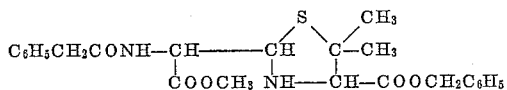

and treating said penicilloate with hydrogen chloride.

References Cited in the file of this patent

UNITED STATES PATENTS

| | | |
|---|---|---|
| 2,552,478 | Cook et al. | May 8, 1951 |
| 2,934,540 | Sheehan | Apr. 26, 1960 |

FOREIGN PATENTS

| | | |
|---|---|---|
| 569,728 | Belgium | Nov. 15, 1958 |

OTHER REFERENCES

The Chemistry of Penicillin, page 542 (1949), Princeton University Press.

Fieser et al.: Organic Chemistry, pages 453–455 (1950), second edition.

Sheehan: Jour. Amer. Chem. Soc., volume 79, pages 1262–3 (1957).